United States Patent
Cromer et al.

(10) Patent No.: US 6,249,812 B1
(45) Date of Patent: Jun. 19, 2001

(54) INTERACTIVE SYSTEM SUPPORT USING A SYSTEM MANAGEMENT ASIC

(75) Inventors: Daryl Carvis Cromer, Cary; Gregory William Kilmer, Raleigh; Howard Jeffrey Locker, Cary; Randall Scott Springfield, Chapel Hill; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,658

(22) Filed: Oct. 1, 1998

(51) Int. Cl.⁷ ...................................................... G06F 17/60
(52) U.S. Cl. .............................. 709/221; 709/220; 714/26
(58) Field of Search ..................................... 709/221, 220; 714/26, 4, 46, 712; 235/379

(56) References Cited

U.S. PATENT DOCUMENTS

| | | | |
|---|---|---|---|
| 5,483,637 | * 1/1996 | Winokur et al. | 714/26 |
| 5,666,481 | * 9/1997 | Lewis | 714/4 |
| 5,701,305 | * 12/1997 | Albrecht | 714/712 |
| 5,790,780 | * 8/1998 | Brichta et al. | 714/46 |
| 5,984,178 | * 11/1999 | Gill et al. | 235/379 |
| 6,026,500 | * 12/2000 | Topff et al. | 714/26 |

* cited by examiner

*Primary Examiner*—Ayaz Sheikh
*Assistant Examiner*—Khanh Quang Dinh
(74) *Attorney, Agent, or Firm*—Bernard D. Bogdon; J Bruce Schelkopf; Bracewell & Patterson, LL (57) ABSTRACT

A client on a network is provided with auxiliary low power logic, at the network adaptor, that is always active and simulates network traffic (e.g., Ethernet format) normally sent under control of the main client system processor(s). This logic collects client status information and reports to the network manager, irrespective of the system's CPU power level, information and provides for interaction between the user and the administration or network manager to exercise broader control and perform repair and upgrades which would otherwise require a dialog with the user and/or limit repair and reconfiguration of the client system to off-hours activity. The auxiliary logic also can receive and interpret commands from the network that conform to a predefined format.

18 Claims, 10 Drawing Sheets

INTERACTIVE SYSTEM SUPPORT USING A SYSTEM MANAGEMENT ASIC

BACKGROUND OF THE INVENTION

1. Field of the Invention

The present invention relates to computer systems coupled to a network and more particularly to a system having logic to transmit and receive transmissions across a connection to a network to provide for automatically reporting error conditions and reporting messages to users.

2. Description of Related Art

Personal computer systems are well known in the art. Personal computer systems have attained widespread use for providing computer power to many segments of modern society. Personal computers (PCS) can typically be defined as a desktop, floor standing, or portable microcomputer that includes a system unit having a single central processing unit (CPU) and associated volatile and non-volatile memory, including random access memory (RAM) and basic input-output system read only memory (BIOS ROM), a system monitor, a keyboard, one or more flexible diskette drives, a CD-ROM drive, a fixed disk storage drive (also known as a "hard drive"), a "mouse" or pointing device, and an optional network interface adapter. One of the distinguishing characteristics of these systems is the use of a motherboard or system planar to electrically or operationally connect these components together. Examples of such PCS are computer systems within IBM's PC 300 series and IBM's IntelliStation Series. The PC of the before referenced related patent documents identified in the illustration of FIG. 3 thereof and as described in the patent document specifications thereof, is an example of a typical client computer system.

With PCS being increasingly connected into networks to allow transfers of data among computers, more operations such as maintenance, updating of applications and data collections are occurring over the network. As computers are also becoming more and more essential to their users it is desirable to minimize loss of productivity by increasing the availability of PCS. This includes detection and reporting of intermittent failures on a system that will allow system administrators to schedule maintenance for the PC at a convenient time. In addition, the immediate detection and reporting of an inoperable PC is required, since it has an immediate impact to productivity. There is no reason to wait until employees arrive on the next working day to discover that the machine failed yesterday or over the weekend.

One solution to this problem has been alert technology, such as IBM's Alert on LAN technology, which supports detection and reporting of failures over a network. The alert on LAN solution creates network alerts to provide event and status information to a network administrator. The technology detects and reports events such as operating system (OS) hang, POST/BIOS error codes, or voltage and temperature problems.

When the system administrator receives error messages from a remote client, that information is used to generate a "trouble ticket." The trouble ticket contains the critical information required to set up a service call. This method is typical for systems at remote sites and at a site usually mostly available to non-skilled workers, since the service call is placed automatically.

The disadvantage to this method is that a simple error or fault can and usually does result in an expensive and time consuming service call. So often, even when the simplest of errors is not diagnosed, the system is out of commission until a service call is performed.

What is needed is an effective mechanism to automatically provide a level of support to identify, service and eliminate as many errors or malfunctions as possible, before generating a "trouble ticket" and experiencing what is normally an expensive service call.

SUMMARY OF THE INVENTION

It is recognized by the invention, that the ability to receive additional status from the client and the ability to send instructions to the user would allow the network manager to reduce service calls. However, it is not desirable to change from existing PC network structures and protocols and the major installed infrastructure of PC networks to accomplish this. According to the invention, logic is provided that is always active and simulates normal network data traffic (e.g., Ethernet format) normally sent from and received by the client system.

Preferably, network updates are sent out by the special purpose logic to keep the network manager aware of selected status information. According to a preferred implementation, the signals are introduced to the client side of the "physical layer" of the network controller. The physical layer is the layer that conditions the network-directed signal to analog form to go out over the physical-connecting network. By so configuring the signal to have the characteristics of a standard network signal prepared by the client, it passes through the network the same as would any normal network signal sent by the client.

The client stays active, preferably full time, and is able, on an ongoing basis, to keep the management server aware of selected information regarding detected conditions at the client system. By so maintaining at the client the ability to send alerts to the management server, the management server is made aware of the actual conditions at the client and has greater latitude of flexibility in responding with instructions or procedures on respective clients. It may even determine that a problem is beyond the resolution capabilities of the invention and generate a trouble ticket.

The present invention recognizes certain normal errors that involve "minor" correction, as opposed to replacement of components, such as resetting the keyboard, which are usually expensive and time consuming because a service person generally must address the problem at the site. By so sending messages that can be and are generated in response to error conditions, modifying the system operation such that the video display can be controlled to display the messages, and then providing logic to receive the requisite signals in special predefined network commands all without OS or application software intervention at the client system, such "minor" corrections can be performed by the management server without requiring a service call.

The management server receives alert messages from the client machine that contains the machine ID, language support, and error condition. The management server based on the error condition, either sends a response message to the client machine in the appropriate language or generates a trouble ticket. The management server has a predefined response file based on the client type and the error condition which file allows for automatic response.

The system can detect and isolate problems, including, but not limited to the following: keyboard failure/key stuck; keyboard/mouse unplugged; non-boot diskette in drive A; time date failure; memory failure and OS hang-need to reboot.

DETAILED DESCRIPTION OF THE INVENTION

While the present invention will be described more fully hereinafter with reference to the accompanying drawings, in which a preferred embodiment and exemplary illustrations of the present invention are shown, it is to be understood that with regard to the description of the specification and figures, that persons of ordinary skill in the appropriate arts may modify the invention herein described while still achieving the favorable results of this invention. Accordingly, the description which follows is to be understood as being a broad, teaching disclosure directed to persons of ordinary skill in the appropriate arts, and not as limiting upon the present invention.

Figure 1:
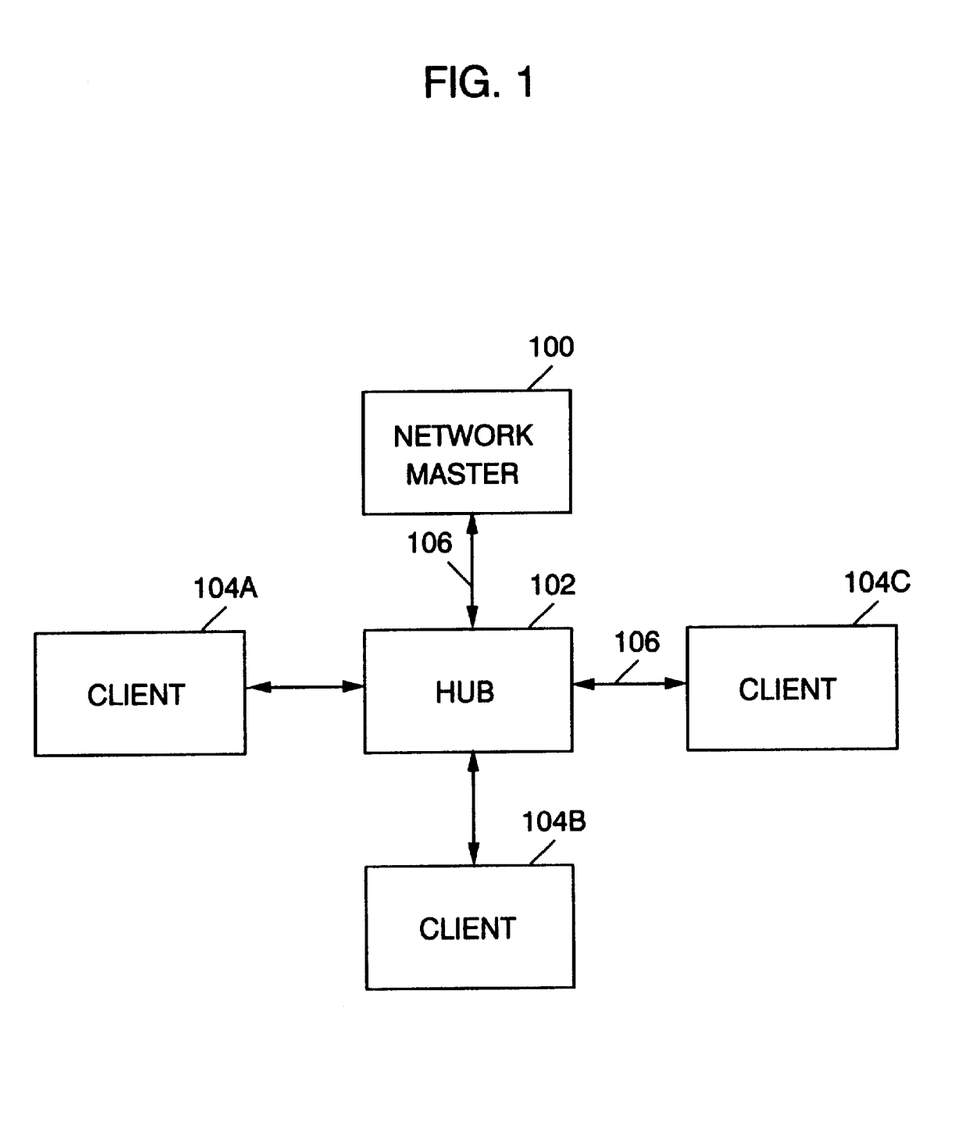
FIG. 1 is a block diagram of a network arrangement suitable for implementation of the invention.

Referring to FIG. 1, a network master 100, hereinafter sometimes referred to as management console, is connected to a hub 102 by a LAN connector bus 106. Respective client stations or systems 104, illustrated as exemplary systems 104A, 104B and 104C, are also connected to the hub 102 through respective LAN busses 106. The preferred illustrated and exemplary form of network conforms to the Ethernet specification and uses such hubs. It will be appreciated however that other forms of networks, such as, but not limited to, Token Ring are applicable to the present invention.

Figure 2:
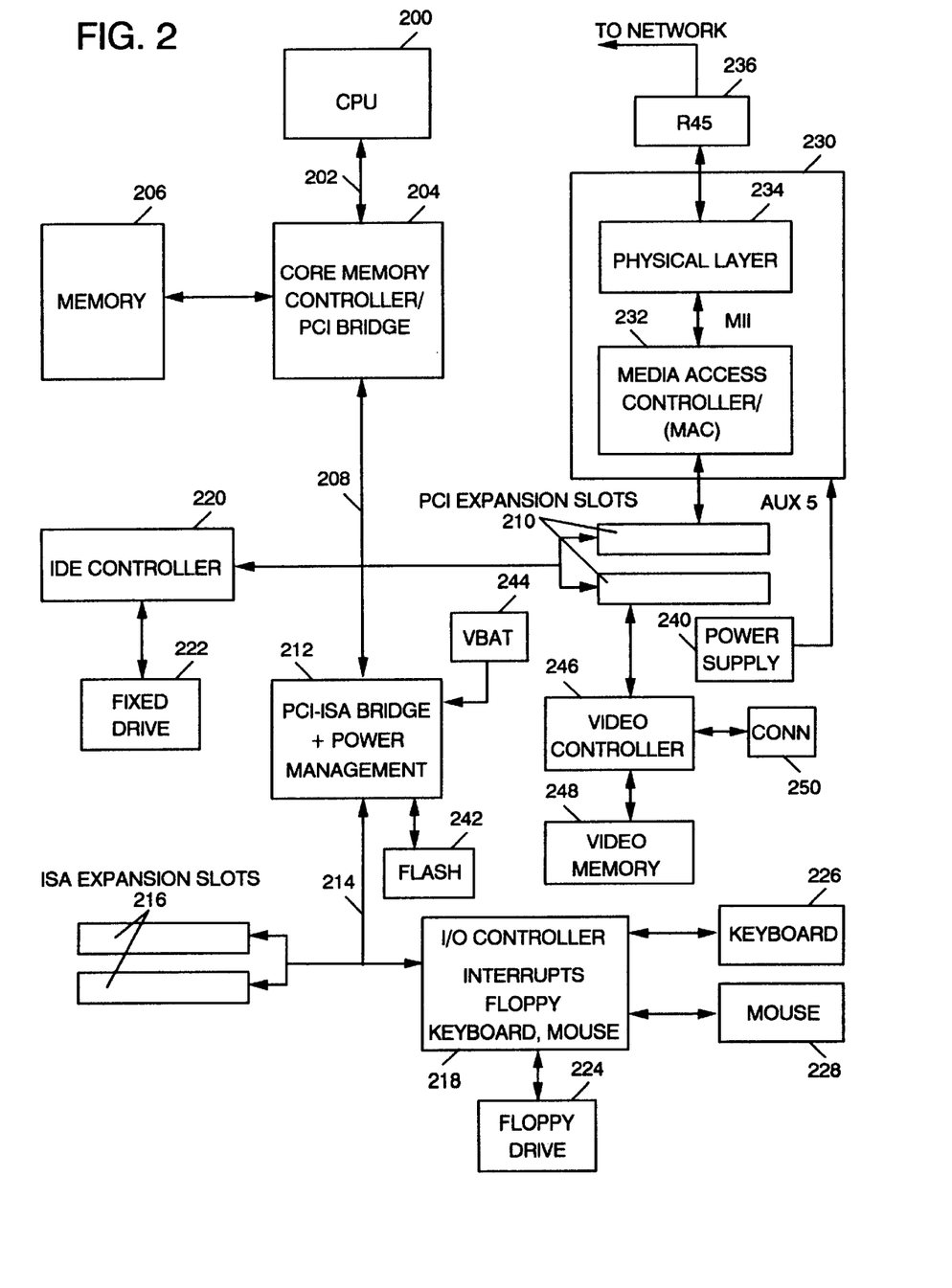
FIG. 2 is a block diagram of a system client with normal network connection circuitry.

A computer system suitable for use as a client station 104 to embody the present invention is indicated in FIG. 2. A central processing unit (CPU) 200 is connected by address, control and data busses 202 to a memory controller and PCI bus bridge chip 204. System memory 206 is connected to the memory controller 204. Connected to standard PCI expansion bus 208 are the memory controller PCI bridge chip 204, IDE device controller 220, PCI connector slots 210, and a PCI bus to ISA bus bridge chip 212 which typically, also includes, power management logic. ISA standard expansion bus 214 with ISA expansion connector slots 216 is connected to bridge chip 212. It will be appreciated that other expansion bus types may be used to permit expansion of the system with added devices and it is not necessary to have two expansion busses.

In an intelligent client station 104 there would normally be input devices and data storage devices such as a fixed and a floppy drive 222 and 224, respectively. The fixed drive 222 is connected to IDE controller 220, whereas the floppy drive 224 is connected to I/O controller 218.

PCI-ISA bridge controller 212 includes an interface for Flash memory 242, which contains microcode, which system 104 executes upon power-on. The flash memory 242 is a non-volatile storage device, such as an electrically erasable programmable read only memory (EEPROM) module and includes BIOS that is used to interface between the IO devices and operating system. PCI-ISA bridge controller 212 also contains CMOS which is used to store system configuration data. That is, the CMOS will contain values, which describe the present configuration of the system 104. For example, CMOS contains information describing the list of IPL devices set by a user and the sequence to be used for a particular power method, the type of display, the amount of memory, time, date, etc. Furthermore, these data are stored in CMOS whenever a special configuration program, such as configuration/setup is executed. PCI-ISA bridge controller 212 is supplied power from battery 244 to prevent loss of configuration data in CMOS.

Client system 104, has a video controller 246, which may, for example, be plugged into one of the connector slots 210. The video controller 246 is connected to video memory 248. The image in video memory 248 is read by controller 246 and displayed on a monitor typically connected to client 104 through connector 250.

A client system 104, has a network adapter 230, which, for example, may be plugged into one of the PCI connector slots 210 or, in the alternative, could be connected to one of the ISA connector slots 216. The client system 104 is shown with a special power supply 240 which supplies full normal system power and has an auxiliary power Aux 5 which supplies full time power to the power management logic 212 and the network adapter 230. This enables the system, as is known, to respond to a wake-up signal from network adapter 230 and power-up the system. The network adapter 230 consists of a physical layer 234 and a media access controller (MAC) 232 connected through the Media Independent Interface (MII) or local bus. The MAC 232 serves as an interface between a shared data path, i.e., the MII, and the PCI bus 208. The MAC 232 performs a number of functions in the transmission and reception of data packets. For example, during the transmission of data, the MAC 232 assembles the data to be transmitted into a packet with address and error detection fields. Conversely, during the reception of a packet, the MAC 232 disassembles the packet and performs address checking and error detection. In addition, the MAC 232 typically performs encoding/decoding of digital signals transmitted over the shared path and performs preamble generation/removal as well as bit transmission/reception. As an example, the MAC 232 may be an Intel 82557 chip. The MII bus is a specification of signals and protocols, and formalizes the interfacing of a 10/100 Mbps Ethernet Media Access Controller (MAC) 232 to the underlying physical layer 234.

The physical layer 234 conditions analog signals to go out to the network, for example, an Ethernet network over an R45 connector 236, as is well known. For example, the physical layer 234 can be a fully integrated device supporting 10 and 100 Mb/s CSMA/CD Ethernet applications. The physical layer 234 receives parallel data from the MII local bus and converts it to serial data for transmission through the connector 236 and over the cable network. The physical layer 234 is also responsible for wave shaping and provides analog voltages to the network. The physical layer can be, for example, an Integrated Circuits Systems chip ICS-1890. The physical layer 232 includes auto-negotiation logic that serves three main purposes. First, it determines the capabilities of the main computer, secondly it advertises its own capabilities to the main computer, and thirdly it establishes a connection with the main computer using the highest performance connection technology.

The media access controller (MAC) 232 processes the network signals in digital form and connects to the PCI bus 208. The network adapter 230, it should be appreciated, may be added as an adapter card, as shown, or implemented directly on the system motherboard. To support wake up operation, in the illustration of FIG. 2, it is powered from the full time auxiliary line Aux 5.

Figure 3:
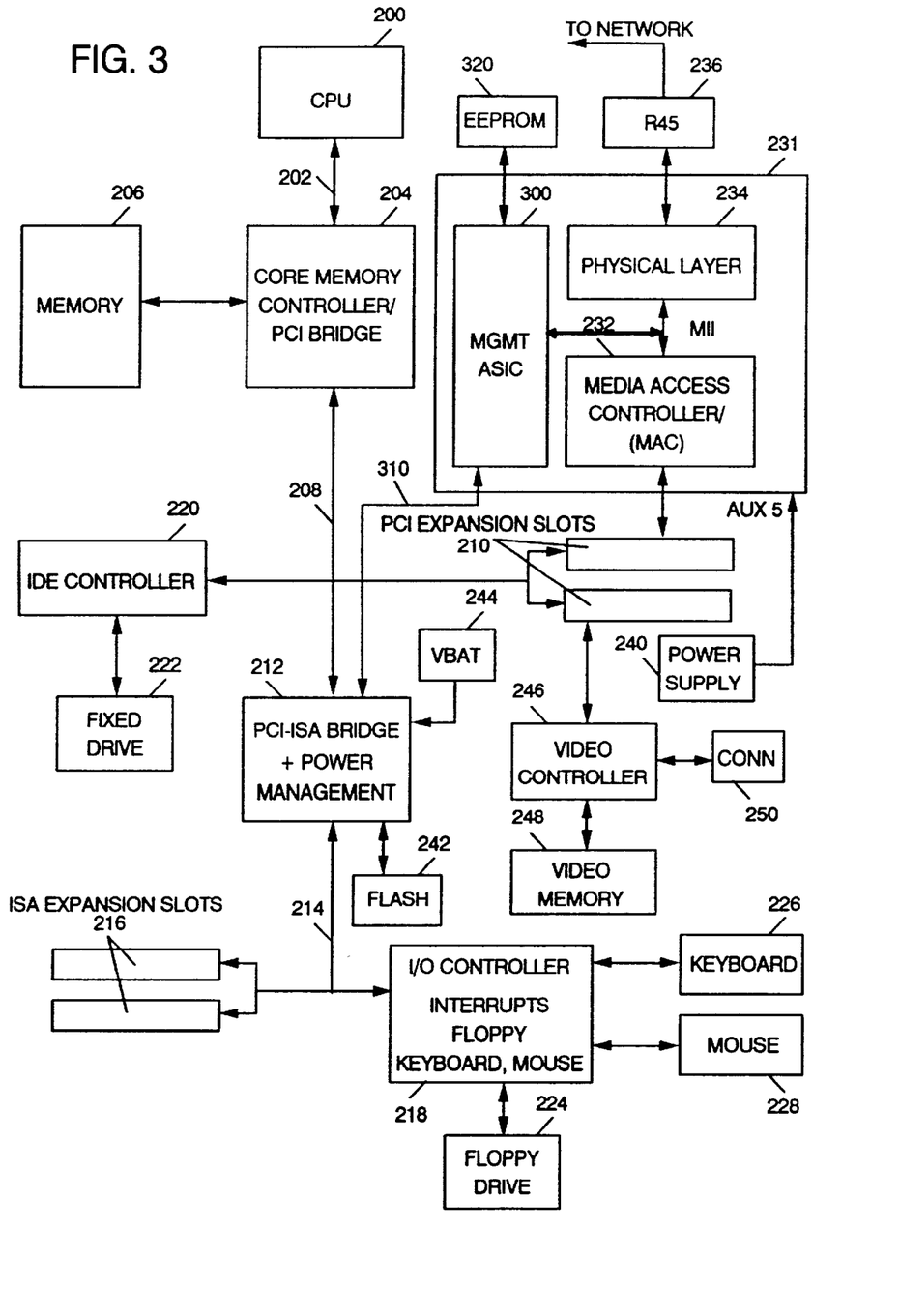
FIG. 3 is a block diagram of a system client with added logic coupled to the network connection circuitry for receiving and executing a command.

The illustrated exemplary client system 104 of FIG. 3 incorporates a specially modified network adapter 231 with a logic module 300, according to the principles of the present invention, connected at the MII bus that extends between the physical layer 234 and the MAC 232. This logic may be a "hard wired" application specific integrated circuit (ASIC) or a programmed general-purpose processor which is programmed as more fully described herein below. By so connecting the logic 300 at the MII bus, it can send and receive network packets using the physical layer 234. Since the invention operates by using hardware to handle a limited number of predefined packets that are created and decoded by hardware, this approach bypasses the software stack or layers of program code and allows the management ASIC 300 to send and receive UDP (User Datagram Protocol) datagrams through the physical layer and improve the system speed. The principles taught could be applied to integrated MAC-PHY solutions such as Intel product #82558, or integrated MAC-PHY Management ASIC solutions.

Figure 4:
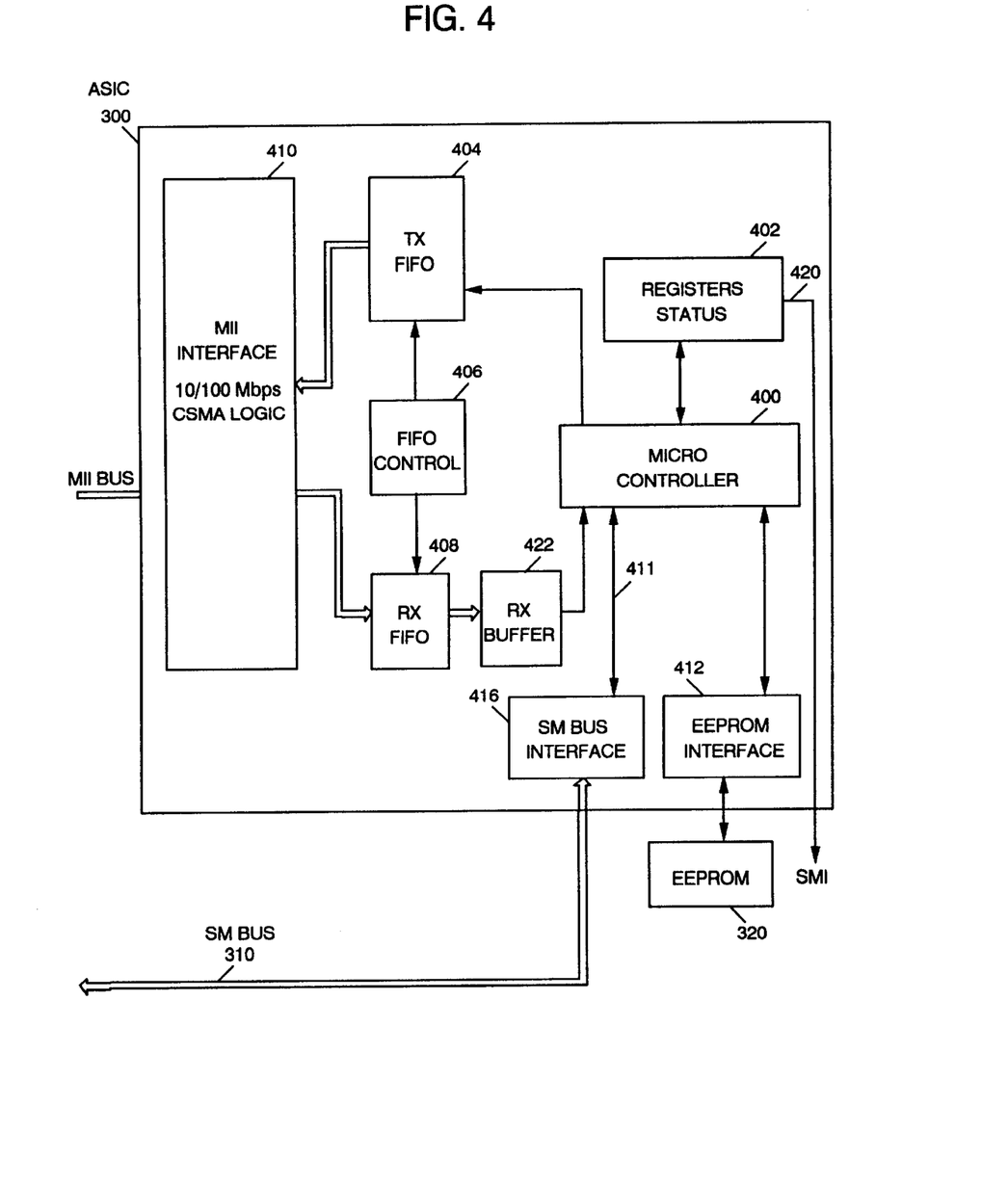
FIG. 4 is a detailed block diagram of the management ASIC from FIG. 3, and logic for the invention.

Management ASIC 300 is connected to bridge controller 212 via the System Management (SM) bus 310. This provides a path to allow software running on PC 104 to access the management ASIC 300 and the EEPROM 320. Component modules of the logic 300 are indicated in FIG. 4. The micro-controller 400 consists of several state machines to handle the following tasks: packet reception, packet transmission, SM bus interface, and EEPROM updates. The micro-controller 400 sends commands to FIFO control 406 to control data flow from TX (transmission) FIFO 404, RX FIFO 408 and RX Buffer 422. The micro controller 400 also responds to SM bus 310 request from software running on PCS 104 to access Register Status 402 or access EEPROM 320. Signals are received from the MII bus by interface unit 410 and passed to Reception (RX) FIFO (first-in-first-out) 408. Micro-controller 400 coordinates the processing of information according to the principles of the present invention.

The micro-controller 400 accesses EEPROM 320 through control lines to EEPROM interface 412 to obtain values to create network packets such as source and destination MAC address, IP protocol information, and authentication headers, User Datagram Protocol (UDP) headers. Furthermore, EEPROM 320 retains the Universal Unique Identifier (UUID).

Figure 5:
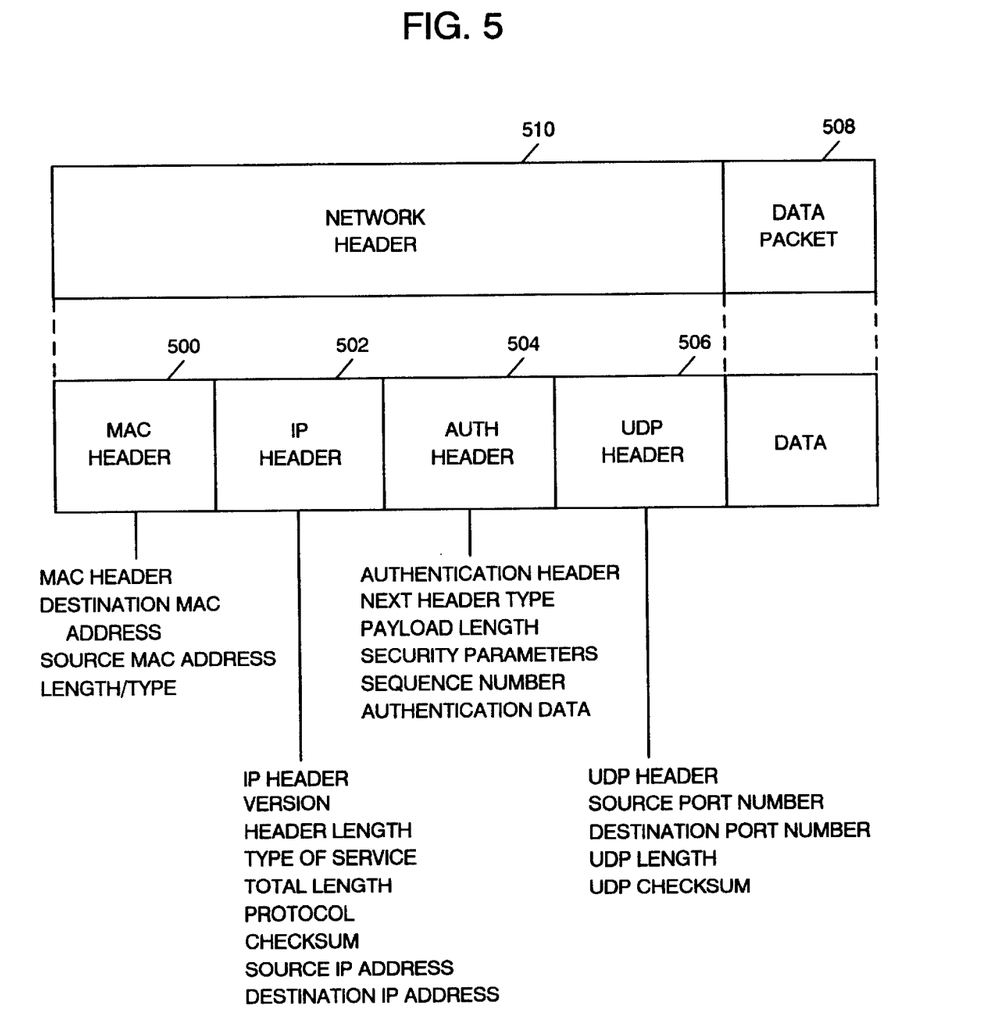
FIG. 5 is a diagrammatic representation of a packet, exemplary of a kind prepared for a LAN system based on an Ethernet specification.
Figure 6:
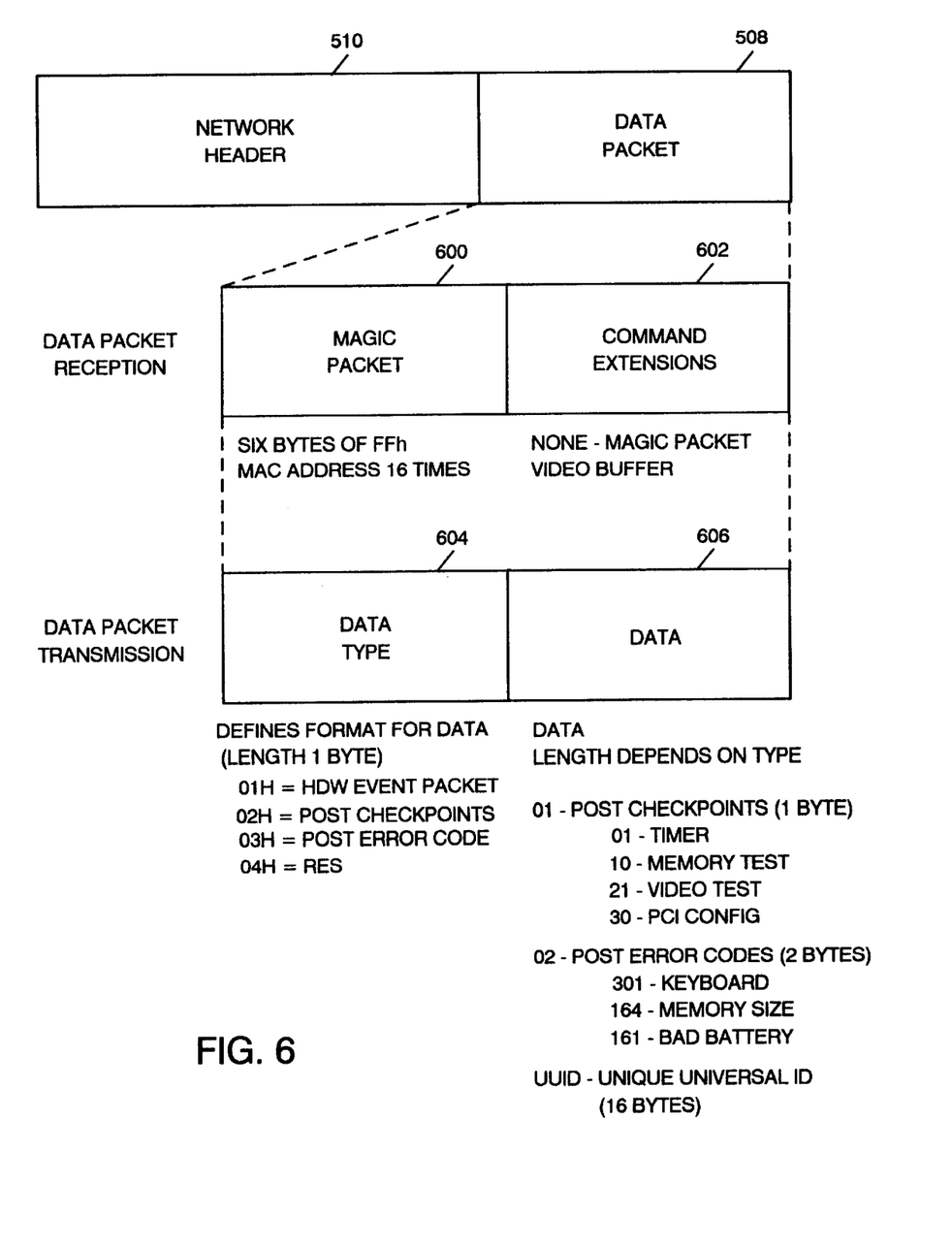
FIG. 6 is a diagrammatic representation of the data area from FIG. 5 with details for reception according to the principles of the present invention.

A standard packet including a network header and data packet, as might be sent over an Ethernet network, is indicated in FIG. 5. The network header 510 includes a MAC header 500, an IP header 502, Authentication header 504, and UDP header 506 as is known to provide addresses, identifiers and other information for assuring correct transfer. The data packet 508 includes the information content to be transferred. For reception, the standard Magic Packet 600, as shown in FIG. 6, content is known 6 bytes of FF followed by 12 copies of client MAC address is known. The data packet 508 may also contain command extensions 602. With the special extensions, the network manager 100 may send commands to logic 300 to be displayed on client 104 monitor.

For the transmission of packets, logic 300 in client 104 under the control of Power-On Self Test may report an error condition. Typically computer systems will display the error code on the monitor connected to client 104. IBM's Alert On LAN technology also allows for sending the error code to the network manager 100 via generation of a datagram, the substance of which is illustrated in FIG. 6. This allows the network manger 100 to understand the failing condition on client 104 and determine whether or not to take corrective action. For purpose of illustration two type of errors are identified: POST checkpoint hang and POST error codes.

The Network Manager 100 may determine that the error condition is simple and decide to send corrective action instructions to client 104. When packets are received by logic 300, the data patterns, according to the principles of the present invention as indicated in FIG. 6 are preferably followed. The base of the packet is the Magic Packet 600 with command extension 602. The Magic packet is used as a base, since network controller recognize Magic Packet 600 as a management packet and non standard network data. The command extension to the magic packet contains the contents of video memory. The packet is received by the physical layer 234 and placed on the MII bus. The MAC 232 detects that a magic packet 600 was sent to client 104 and ignores the packet since the machine is already on. The logic 300 also receives the packet at the MII interface 410. The data is transferred to RX FIFO 408 and then to RX buffer 422. The micro-controller 400 inspects the packet and determines that the data contains a data for video memory and drives SMI 420.

The CPU 200 under control of POST, transfers the contents of the video memory from RX buffer 422 to video memory 248. Logic 300 provides an offset and length for contents of data in RX buffer 422.

Figure 7:
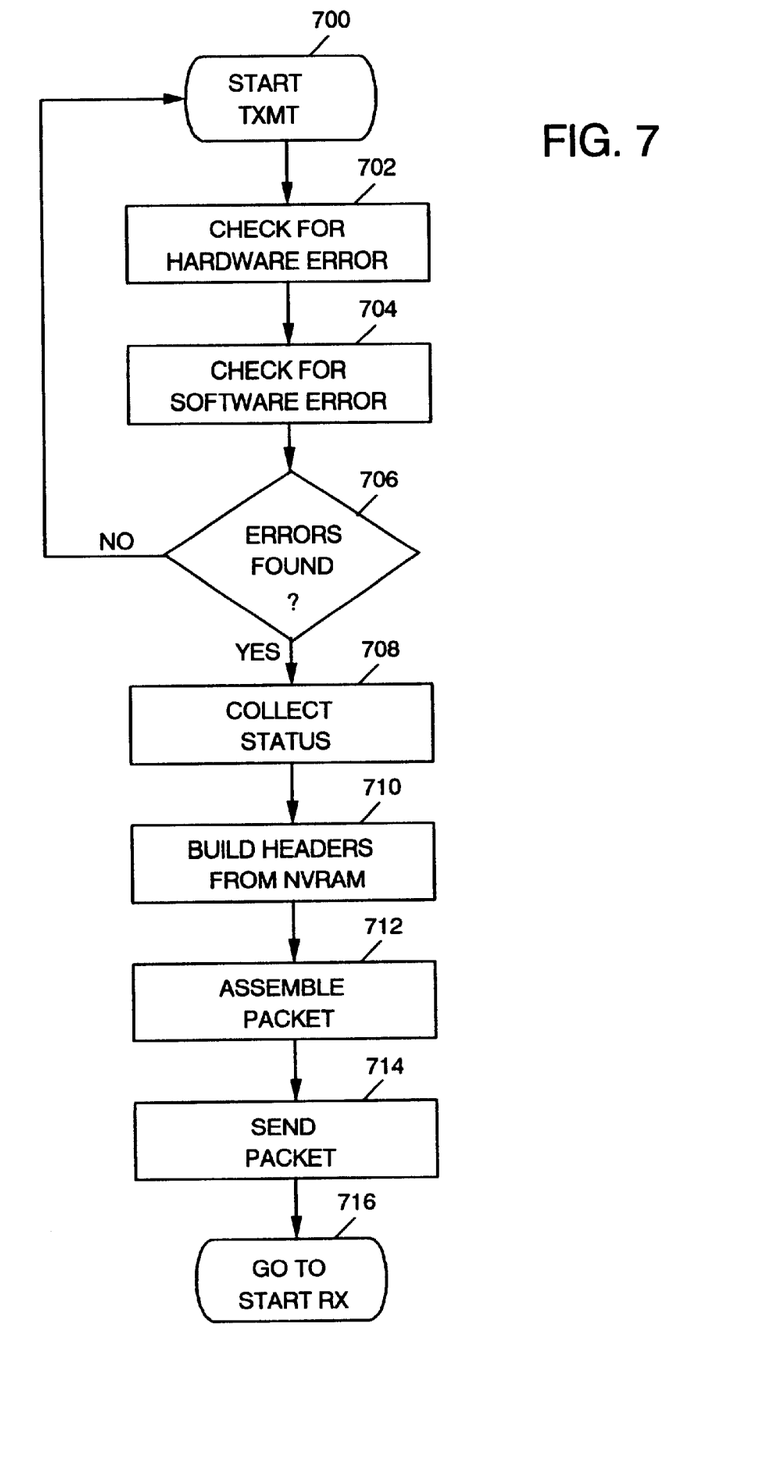
FIG. 7 is a flow chart indicating logic for generation of the transmitted data packets of FIG. 5 for implementation as hard logic or using a programmed general purpose processor.

Referring to FIG. 7, there is illustrated the process starting at TXMT step 700, the start of the transmit routine, used by micro-controller 400 in implementing the invention. The micro-controller 400 checks for hardware error 702 which is indicated by POST checkpoints 606 in status register 402. Next micro-controller 400 checks for software error 704 by a check for POST error codes 606 in status register 402. If no errors are found, the micro-controller 400 starts over at step 700. When errors are detected, micro-controller 400 collects status 708 from register status 402 and pulls the header information 510 from EEPROM 320 via EEPROM interface 412. Next micro-controller 400 assembles a packet 712 and sends the packet, by transferring the data to TX FIFO 404. The packet is then sent from TX FIFO 404 to MII Interface 410 to physical layer 234 to RJ45 236.

Figure 8:
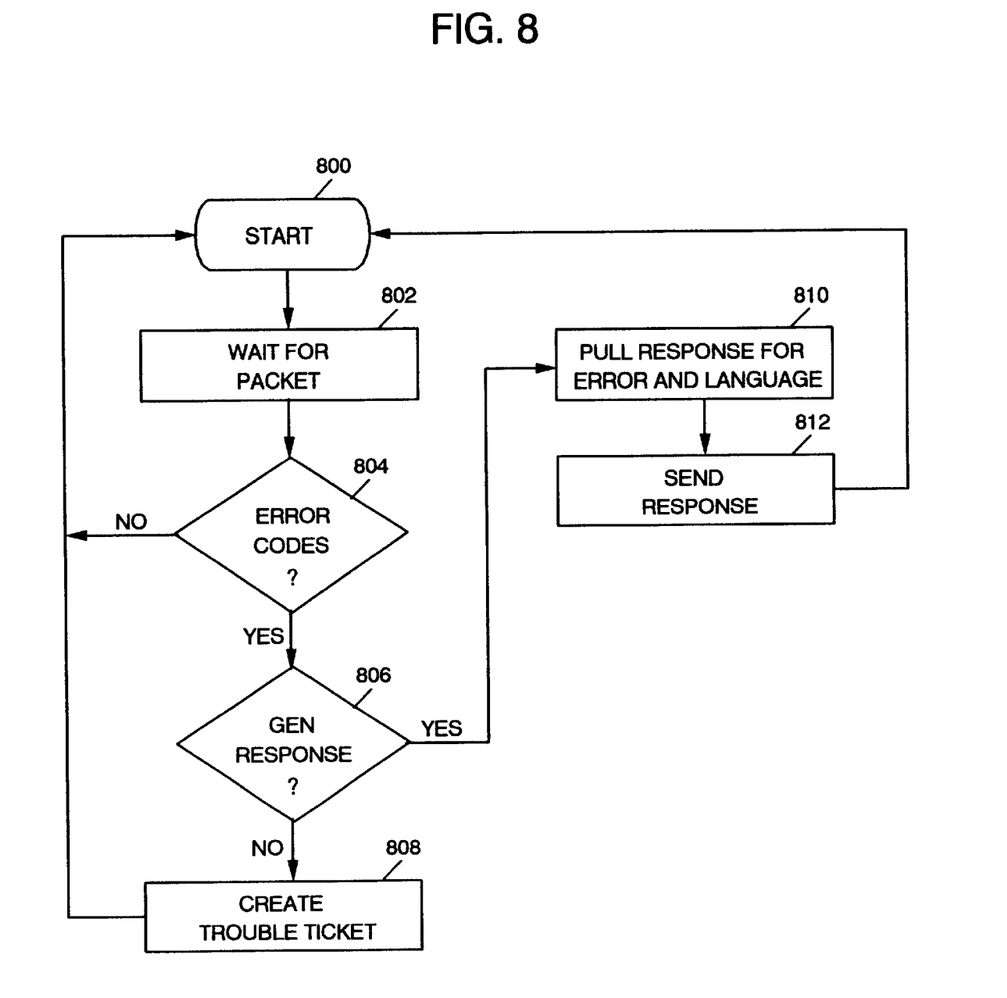
FIG. 8 is a flow chart indicating logic for handling management server events.

Referring to FIG. 8, is the operation of network manager starting at 800. Network manger 100 waits for packets from client 104 at step 802. Packets are checked to determine if they contain error codes at step 804. If the packet contains an error code it is then checked to determine of Error is of a type to generate a response at step 806. If a response can not be sent, then a trouble ticket is created at step 808. If a response can be generated, then the response for the error code and language is pulled step 810. This would be contained in a data base and the network manger does a simple lookup. The response is then sent in step 812.

Figure 9:
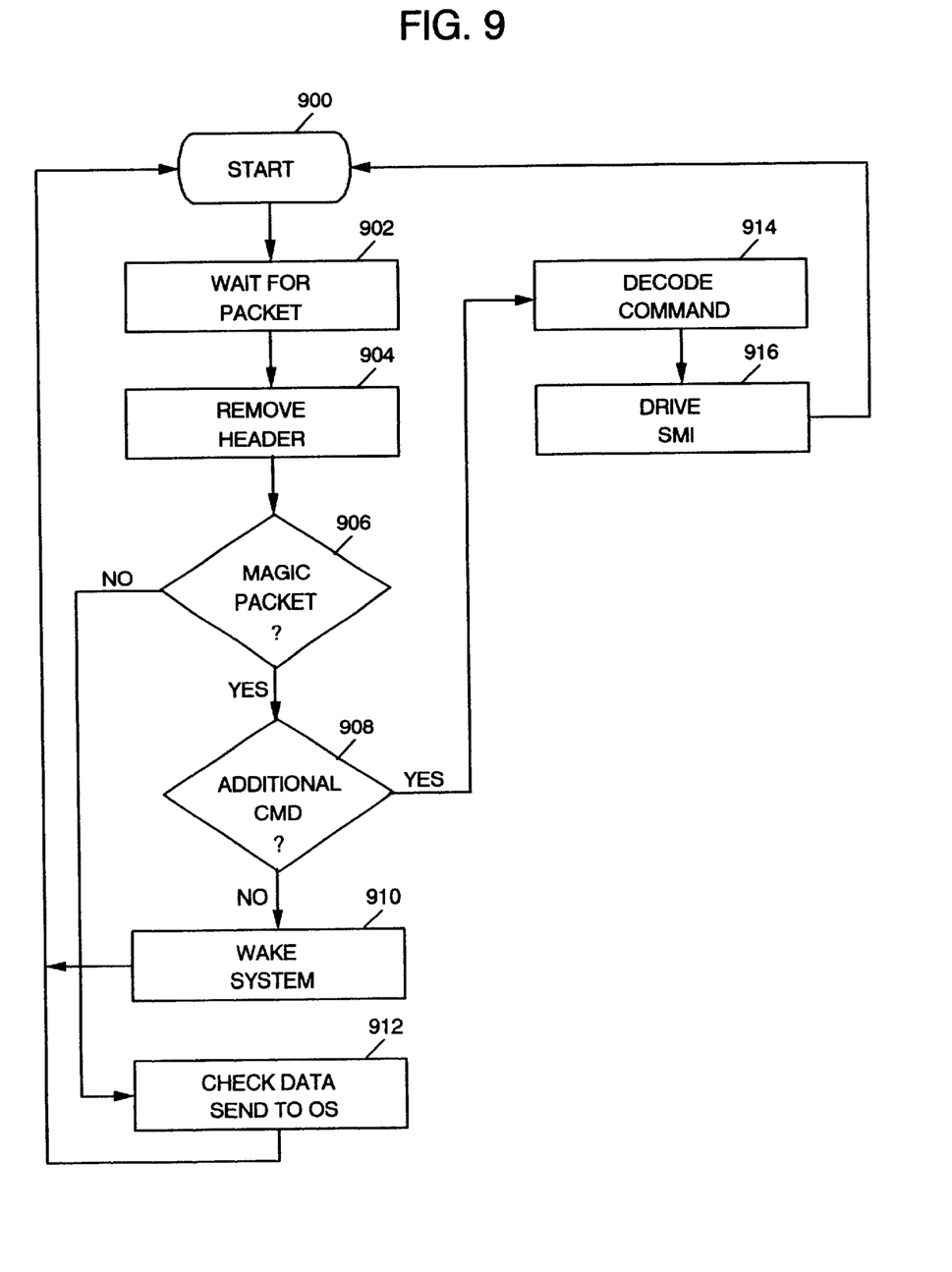
FIG. 9 is a flow chart indicating logic for reception of transmitted data packets of FIG. 5 for implementation as hard logic or using a programmed general purpose processor.

Referring to FIG. 9, there is illustrated the process starting at step 900 used by micro-controller 400 in implementing the invention. Micro-controller 400 waits for packets to be received at step 902. When a packet is received the physical layer 234 places the data on the MII bus which is read by MII interface 410 of logic 300. Logic 300 transfers the data from MII interface 410 to RX FIFO 408 and to RX Buffer 422. Micro-controller 400 then removes the headers at step 904 and checks to determine if data is a magic packet at step 906. If the data is not a magic packet 600, the data is sent to OS at step 912. If the data is a magic packet 600, it is then checked for additional data at step 908. If no additional data if found, then the Wake System command is sent to step 910. If additional data is found then the pointers are set at step 914 and SMI is driven to the system at step 916.

Figure 10:
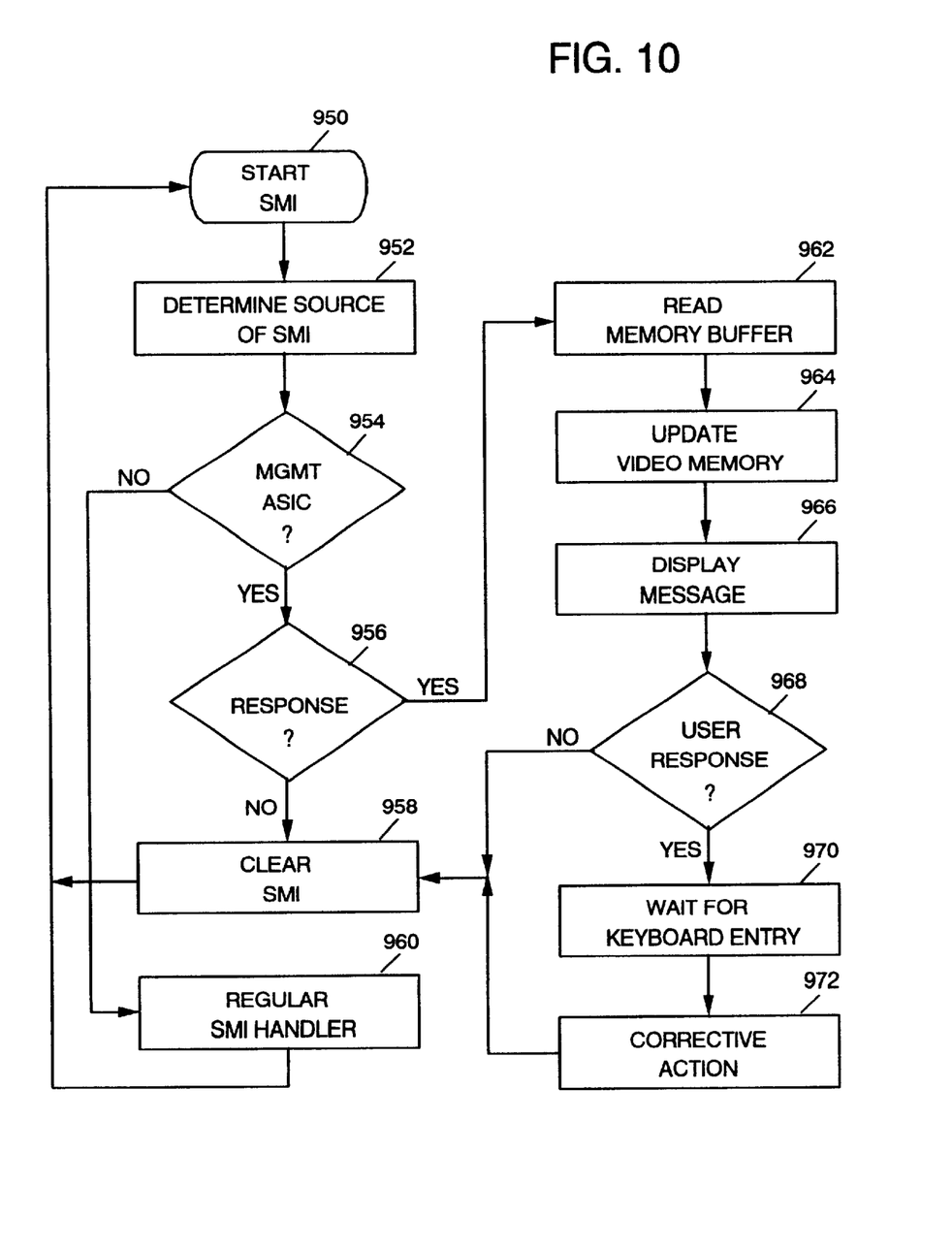
FIG. 10 is a flow chart for operation of the client system according to the principles of the present invention.

Referring to FIG. 10, when the CPU 200 of client system 104 receives the SMI 950, POST/BIOS begins to determine the source 952. If management logic 300 was not the source, then control is transferred to standard SMI handler 960. If logic 300 is the source, then BIOS checks for a response 956. If there is no response the SMI is cleared at step 958. If an SMI is present, then CPU reads contents of RX buffer 422 at step 962. The contents for RX buffer 422 are transferred to video memory 248 at system step 964. The video controller 246 will display the message on the monitor connected to client 104 at step 966. If the message displayed does not require user interaction at step 968, then the SMI is cleared at step 958. If interaction is required then BIOS waits for keyboard entry at step 970 and takes corrective action based on keyboard entry at step 972 then SMI is clear at step 958.

The following are examples for error codes sent by client 104 and responses by management server 100:
Error code: 301
Response: Keyboard initialization failure or key stuck
  Check if keyboard is unplugged
  Make sure no objects lying on keyboard
  Check to see if any keys stuck pressed in
Error: 602
Response: Non-boot diskette in drive A
  Please remove diskette from drive A and hit enter
Error: 160
Response: Time and date failure
  Step by step indication of how to correct
Checkpoint: 01
Response: System hang- need to reboot
  System hang, enter CTL-ATL-DEL
Error: Non-boot diskette in drive A
Response: Remove diskette from drive A and hit enter
Error: Memory failure
Response: Remove SIMM xxx.

The invention has been described with reference to preferred implementations thereof, but it will be appreciated that variations within the scope of the claimed invention will be suggested to those skilled in the art. For example, the invention may be implemented on networks other than Ethernet networks such as token ring networks or used to control other aspects of a system.

What is claimed is:

1. A method for providing system correction data for a client personal computer system without operating system software in a personal computer network including a server having system diagnostic capability and at least one client personal computer system having a system management device in a network adapter including a physical layer connected to the system management device through a media independent interface bus, which physical layer receives network signal packets from the server and sends network signal packets to the server including personal computer system diagnostic data, comprising the steps of:

conducting a POST operation within the client personal computer system;

identifying a problem condition in the POST operation of the client personal computer system by identifying a POST error code condition;

reporting the problem condition to the server having system diagnostic capability, including the steps of:
  generating a datagram as a network signal packet including data identifying the problem condition;
  sending the generated datagram from the physical layer of the network adapter;

receiving corrective action data packets at the physical layer of the network adapter of the client personal computer system from the server having system diagnostic capability as a result of diagnostic analysis of the data of the datagram by the server;

sending the corrective action data packets along the MII bus to the system management device of the personal computer system;

determining that the corrective data packet includes data for video display; and processing the corrective data packet data for video display.

2. The method as defined in claim 1, wherein, after the step of processing the corrective data packet for video display, displaying a message which is included in the corrective data packet data for corrective action to address the problem condition in the personal computer system.

3. The method as defined in claim 1, wherein the step of identifying the problem condition identifies a POST checkpoint hang condition.

4. The method as defined in claim 1, further including the step of sending supplemental data from the personal computer system to the server in response to a received prompt from the server for supplemental data relative to sending diagnostic data for correcting the problem condition identified at POST.

5. The method as defined in claim 3, wherein the step of sending supplemental data from the personal computer system is accomplished by keying information on a keyboard included as a part of the personal computer system.

6. The method as defined in claim 5, further comprising the step of receiving the corrective action data packets at the physical layer of the network adapter of the client personal computer system from the server having system diagnostic capability as a result of diagnostic analysis of the data of the datagram by the server and a determination that the corrective action data packet is a solution to the problem condition identified.

7. A method for providing system correction analysis for a client personal computer system without operating system software in a data network including a server having system diagnostic capability and at least one client personal computer system having a system management device in a network adapter including a physical layer connected to the system management device through a media independent interface bus, which physical layer receives network signal packets from the server and sends network signal packets to the server including personal computer system diagnostic data, comprising the steps of:

conducting a POST operation within the client personal computer system;

identifying a problem condition in the POST operation of the client personal computer system;

reporting the problem condition to the server having system diagnostic capability, including the steps of:

generating a datagram as a network signal packet including data identifying the problem condition;

sending the generated datagram from the physical layer of the network adapter;

analyzing the datagram at the server;

determining if the corrective diagnostic data in the server provides a corrective solution for the problem condition identified in the POST operation;

generating a corrective action data packet for sending to the client personal computer system if it is determined that the generated corrective action data packet provides a solution to the identified problem condition, and if it is determined that the generated corrective action data packet does not provide a solution, generating a service ticket data signal for processing to provide a corrective solution to the identified problem condition in the personal computer system.

8. A personal computer client system, for a LAN network including at least one personal computer client system and a server having diagnostic corrective action data, comprising:

a central processing unit (CPU);

memory;

memory controller connected to the CPU and the memory for controlling memory access;

a non-volatile storage device having BIOS including POST code for determining at POST operational error problems occurring within the personal computer client system;

a network adapter for connection to the server having diagnostic corrective action data for correcting POST operational error problems, the network adapter including a physical layer for sending alert packets identifying an operational error problem to the server and receiving network packet signals on the personal computer network from the server in a predefined analog format and decoding the network packet signals having corrective diagnostic data of the server to a digital format, said corrective data packets including data to correct the operational error identified by the alert packets from the server; and a media access controller connected to the physical layer through a media independent interface (MII) for processing data packets having diagnostic corrective action data received from and for processing data packets having diagnostic supplemental data sent to the server, and for identifying corrective action data packets sent from the server and for determining that the diagnostic corrective action data includes data for video memory and for sending the data for video memory to a video display system.

9. The personal computer client system as defined in claim 8, wherein the physical layer is connected to the LAN network for receiving and transmitting network data packets to and from the server on the network side of the physical layer and for transmission of received network data packets, including data related to the server diagnostic corrective data, on the client side of the physical layer on a media independent interface bus to an auxiliary logic as a part of the network adaptor to detect network data packets received by the personal computer client system that have data including the server diagnostic corrective data.

10. A personal computer client system, for a data network including at least one personal computer client system and a server having diagnostic corrective action data, comprising:

a central processing unit (CPU);

memory;

memory controller connected to the CPU and the memory for controlling memory access;

a non-volatile storage device having BIOS including POST code for determining at POST operational error problems;

a network adapter for connection to the server having diagnostic corrective action data for correcting POST operational error problems, the network adapter including a physical layer for sending and receiving data packets to and from the computer client system to the server and a media access controller connected to the physical layer through a media independent interface (MII) for processing data packets having diagnostic corrective action data received from and for processing data packets having diagnostic supplemental data sent to the server and for identifying corrective data packets sent from the server and for determining that the diagnostic corrective action data includes data for video memory and for sending the data for video memory to a video display system; and     the network adapter including a reception portion, including the physical layer, connected to the data network for receiving the network packet signals on the personal computer network from the server in a predefined analog format and for decoding the network packet signals having the corrective diagnostic data of the server to ta digital format for providing the corrective data for processing by the personal computer.

11. The personal computer client system as defined in claim 10, wherein the physical layer connected to the data network for receiving and transmitting network data packets to and from the server on the network side of the physical layer and for transmission of received network data packets, including data related to the server diagnostic corrective data, on the client side of the physical layer on a media independent interface bus to an auxiliary logic as a part of the network adaptor to detect network data packets received by the personal computer client system that have data including the server diagnostic corrective data.

12. The personal computer client system as defined in claim 11, wherein the auxiliary logic includes a micro controller having state machines for managing data packet reception and data packet transmission.

13. The personal computer client system as defined in claim 10, further including in the personal computer a PCI bus, an ISA bus, a PCI/ISA bridge, and a micro controller having a state machine for managing bus transmission between the network adapter and the PCI bus and the ISA bus.

14. The personal computer client system as defined in claim 13, wherein the media access controller provides a shared data path between the MII and the PCI bus.

15. The personal computer client system as defined in claim 14, wherein the media access controller during the sending of data packets, the media access controller assembles the data into the data packet with address and error detection fields, and during the receiving of data packets the media access controller disassembles the data packet and performs address checking and error detection.

16. The personal computer client system as defined in claim 15, wherein the media access controller further performs encoding/decoding of digital data signals sent over the shared path, and data packet preamble generation and removal.

17. The personal computer client system as defined in claim 10, wherein the video display system receives buffered data in a video memory and a video controller processes the corrective diagnostic data for display.

18. A method for providing system correction analysis for a client personal computer system without operating system software in a data network including a server having system diagnostic capability and at least one client personal computer system having a system management device in a network adapter including a physical layer connected to the system management device through a media independent interface bus, which physical layer receives network signal packets from the server and sends network signal packets to the server including personal computer system diagnostic data, comprising the steps of:

conducting a POST operation within the client personal compute system;

identifying a problem condition in the POST operation of the client personal computer system;

reporting the problem condition to the server having system diagnostic capability, including the steps of:
generating a datagram as a network signal packet including data identifying the problem condition;
sending the generated datagram from the physical layer of the network adapter;

analyzing the datagram at the server;

determining if the corrective diagnostic data in the server provides a corrective solution for the problem condition identified in the POST operation;

generating a corrective action data packet for sending to the client personal computer system if it is determined that the generated corrective action data packet provides a solution to the identified problem condition, and if it is determined that the generated corrective action data packet does not provide a solution, generating a service ticket data signal for processing to provide a corrective solution to the identified problem condition in the personal computer system; and receiving the corrective action data packets at the physical layer of the network adapter of the client personal computer system from the server having system diagnostic capability as a result of diagnostic analysis of the data of the datagram by the server and a determination that the corrective action data packet is a solution to the problem condition identified.

\* \* \* \* \*